Jan. 10, 1961   F. JAKLITSCH   2,967,586
SEPARATOR
Filed Feb. 2, 1956   4 Sheets-Sheet 1
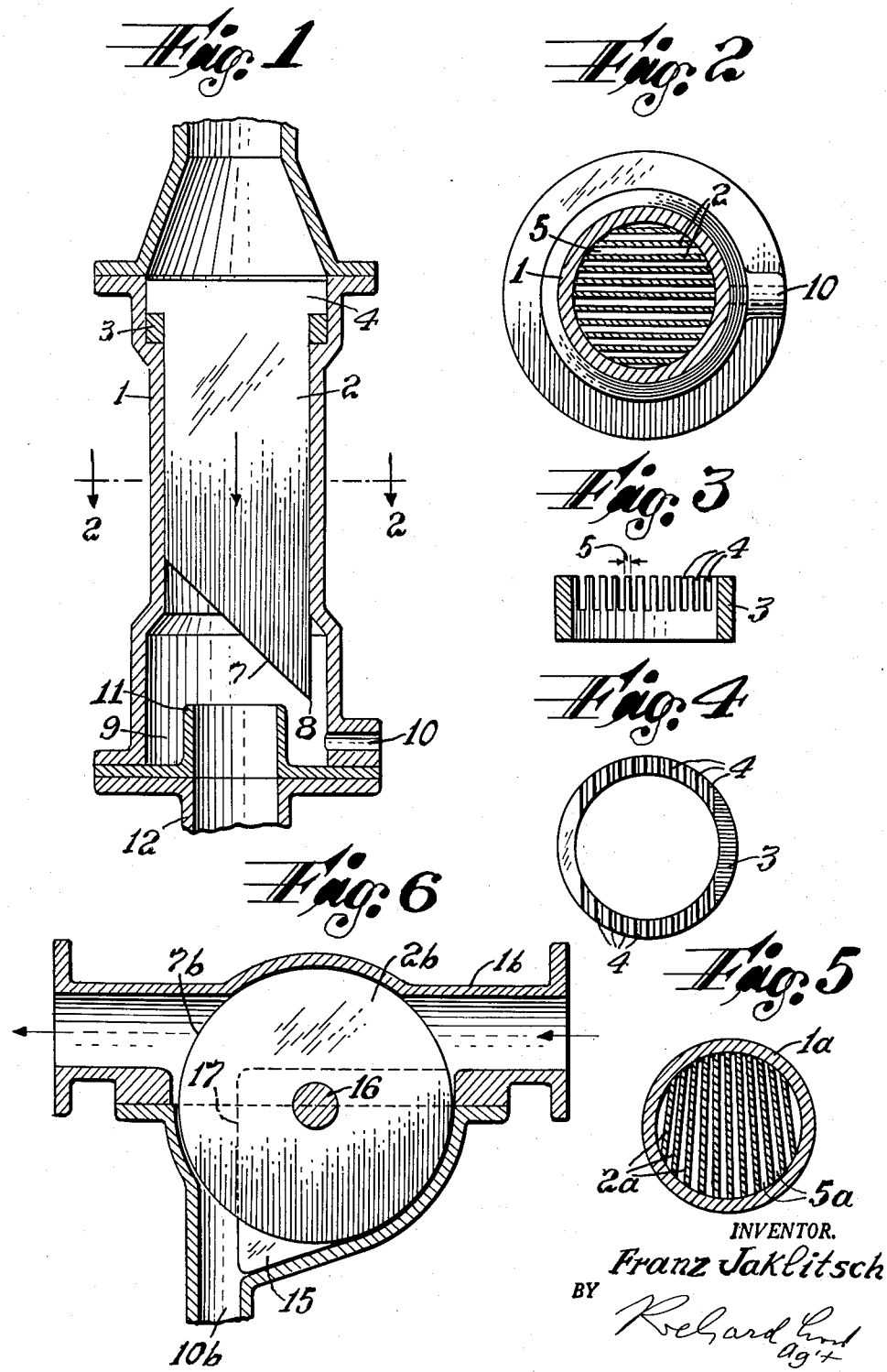
INVENTOR.
Franz Jaklitsch Jan. 10, 1961    F. JAKLITSCH    2,967,586
SEPARATOR
Filed Feb. 2, 1956    4 Sheets-Sheet 2
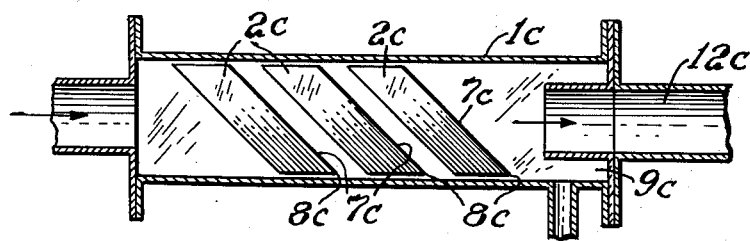
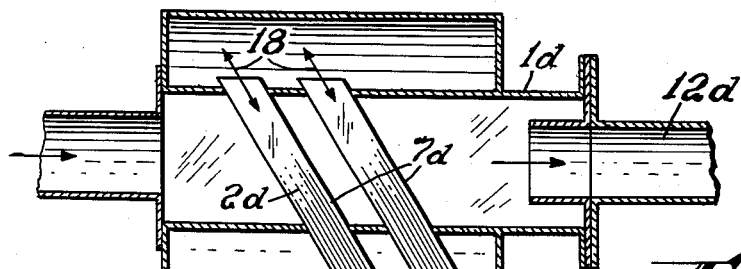
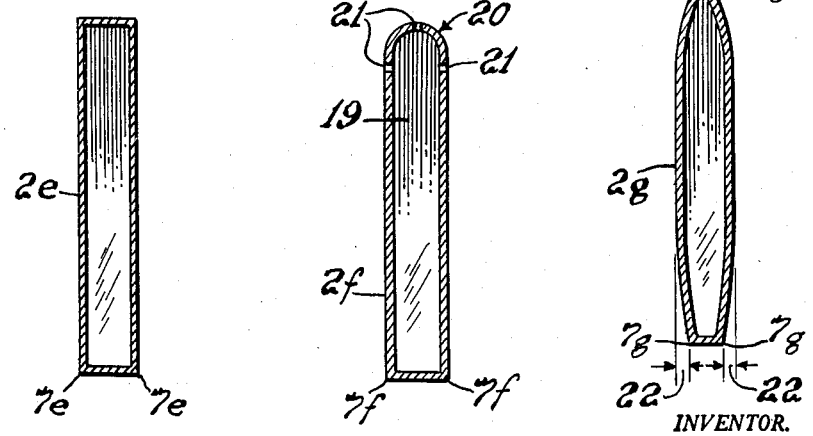
INVENTOR.
Franz Jaklitsch Jan. 10, 1961　　　　　F. JAKLITSCH　　　　　2,967,586
SEPARATOR
Filed Feb. 2, 1956　　　　　　　　　　　　4 Sheets-Sheet 3
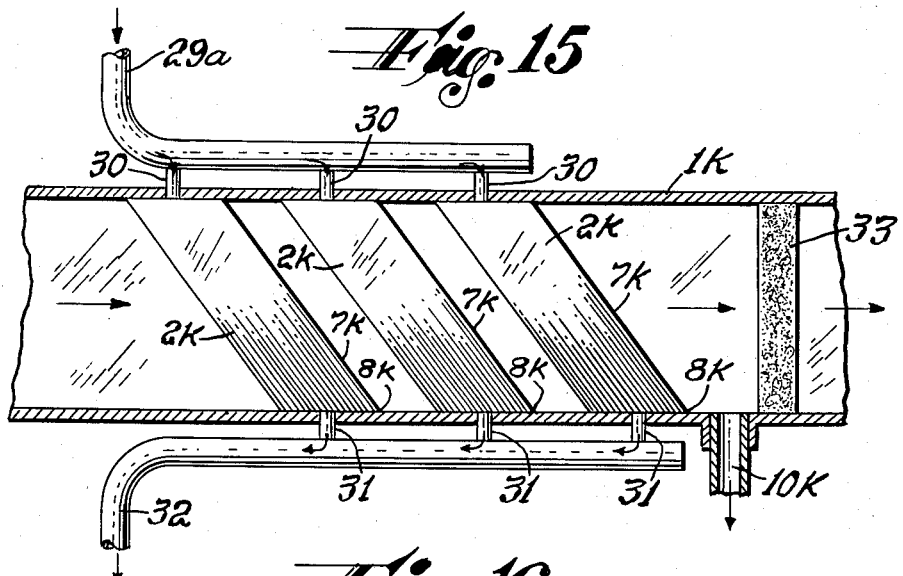
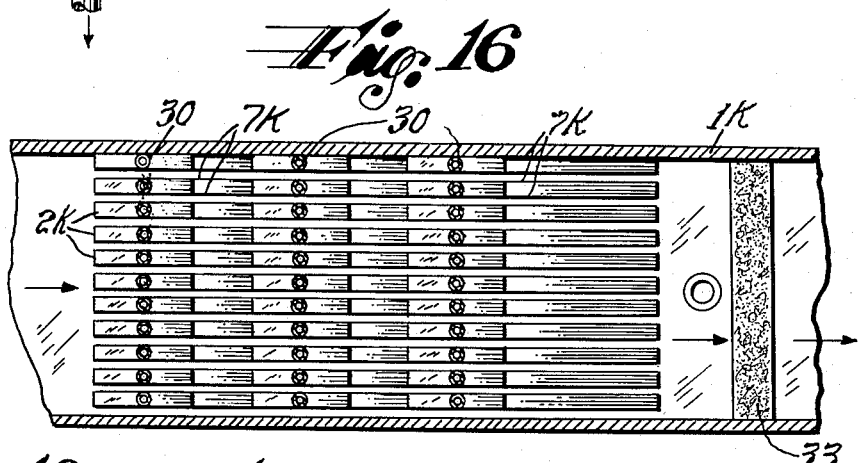
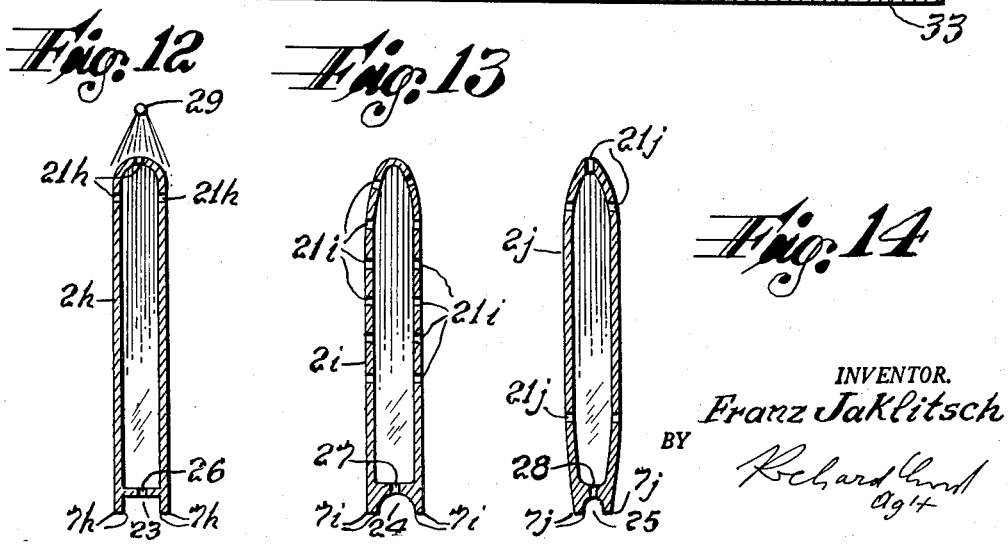
INVENTOR.
Franz Jaklitsch
BY
Richard Lind
Agt INVENTOR.
Franz Jaklitsch United States Patent Office 2,967,586
Patented Jan. 10, 1961

2,967,586
SEPARATOR
Franz Jaklitsch, 823 Marywood, Royal Oak, Mich.
Filed Feb. 2, 1956, Ser. No. 563,034
12 Claims. (Cl. 183—12)

This invention relates to a separator, and more particularly to a device for separating liquid and solid particles from, and contained in, vapors and gases. The separation takes place while the gaseous substance is in motion. This application is a continuation-in-part of my application Ser. No. 491,355, filed March 1, 1955, entitled: "Separator," and now abandoned.

The primary object of my invention is to generally improve devices for separating liquid and solid particles from vapors and gases.

Another object of my invention is to overcome the disadvantages of prior separator constructions.

Still another object of the present invention is to decrease the resistance to the flow of the fluid as much as possible.

Further objects of this invention center about a separator which will be simple in construction, inexpensive to manufacture, and efficient in operation, ensuring a minimum of disturbances of service.

In accordance with my present invention, the foregoing and other objects which appear hereinafter are achieved by providing an apparatus which includes a vessel which defines a passageway for conducting a stream of the gaseous substance to be subjected to the separating action, and precipitating members within the vessel. These members which, for instance, may be of lamellar shape, divide the passageway for the stream of the gaseous substance into narrow crevicelike spaces or sections generally extending in the direction of the stream of the gaseous substance, whereby the hydraulic diameter of a section is approximately 0.2 inch at the most, and at least a portion of the trailing edges of the precipitating members make an oblique (acute) angle with the direction of flow. By trailing edge is meant the edge which is on the exit side of the vessel when the members are considered as extending in the direction of flow, and which is identical with the edge discharging the matter precipitated on the respective member.

In order that the present invention may be fully understood, illustrative embodiments are hereinafter described in detail, merely by way of example, and shown in the accompanying drawings in which:

Fig. 1 is a section taken in elevation through a vertical separator embodying features of my invention;

Fig. 2 is a horizontal section taken in the plane of the line 2—2 of Fig. 1;

Fig. 3 is a section taken in elevation through a grooved ring included in the separator of Figs. 1 and 2;

Fig. 4 is a plan view of the ring of Fig. 3;

Fig. 5 is a cross section taken through a separator which is horizontally disposed;

Fig. 6 is a section taken in elevation through a horizontally arranged modified separator;

Fig. 7 is a schematic section through another modification of a horizontal separator;

Fig. 8 is a schematic section through a further modification of a separator;

Figs. 9 to 14 illustrate six different precipitating members, showing sections thereof, each member being formed as a hollow body;

Fig. 15 is a sectional view, in elevation, of still another modification of a horizontal separator;

Fig. 16 is a plan view, in section, of the separator of Fig. 15;

Figure 17:
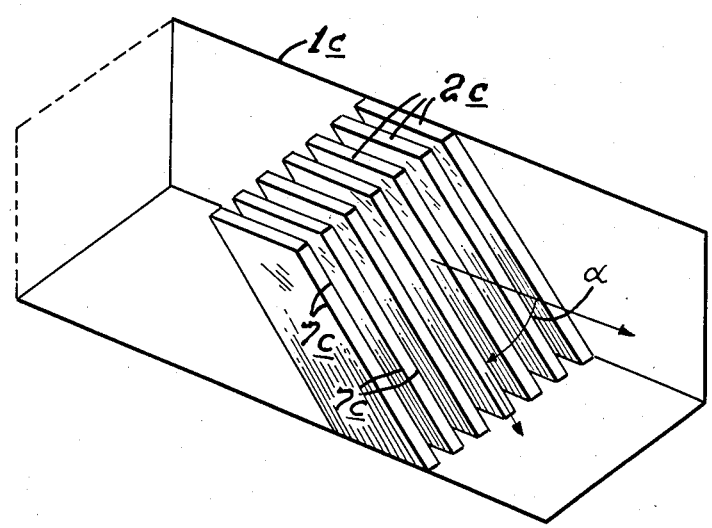
Fig. 17 shows in a perspective view a single group of the three groups of precipitating members shown in Fig. 7.

There are different definitions of the hydraulic diameter. In the present specification and claims the hydraulic diameter is defined as follows:

$$d_H = \frac{\text{area of cross section}}{\text{wetted perimeter of cross section}}$$

Referring to the drawings, and initially to Figs. 1 and 2, it will be seen that a separator embodying this invention includes a vessel 1 which conveys, for instance, a stream of compressed air in the direction indicated by the arrow. The air contains water particles and is to be "demisted." There are precipitating members 2 in the form of lamellar partitions within the vessel, held in place by a grooved ring 3, and dividing the interior of the vessel into crevicelike sections 5. The partitions are suspended from grooves 4 of the ring 3 (see Fig. 3) and extend parallel to one another, each having a trailing or discharging edge 7 which, as shown, is inclined to a corner or point 8 and is actually constituted by two edges. When the air passes through the narrow sections between the partitions, the particles of water suspended in the air precipitate on the partition walls to be taken along by the stream of air until they reach the edges 7. There, the water particles run down along the edges to the points 8 and finally into the trap 9. From the trap, the collected water is withdrawn through the line 10. The flange 11 provided between the vessel 1 and the pipe 12 forms the inner rim of the collecting trap 9.

Instead of the grooved ring 3, other suitable means may be used to secure precipitating members in a fixed spatial relation. Such spacing means may also be used at the end of the discharging edges.

It will be understood that the separator of the invention may also be used for treating other liquid-gaseous mixtures, as well as liquid-solid-gaseous and solid-gaseous mixtures. Mixtures of the first named type are, for instance, steam and other gases, containing oil and/or water and/or particles, such as tar, hydrocarbons, and air containing oil. This kind of separation is used for steam-drying or purifying and for other "demisting" and "defogging" purposes. The second named type mixtures include, for instance, compressed air, or other gases, such as waste gases, steam, containing oil and/or water and dust. A "desmogging" action falls in this group of separations. Mixtures of the last named type include, for instance, air and other gases, containing converter dust, fly ashes, waxlike matter, air-polluting impurities, and aerosols.

It should be noted that a gaseous substance passing through the separator shown in Figs. 1 and 2 is not subjected to a change in the direction of the flow. Nor is there a change in the cross-sectional area within the sections formed between the partitions. Hence, flow losses are reduced to a minimum.

Since the precipitation depends on the cross-section of the crevicelike sections, a simple change of the grooved ring 3 or any equivalent of such a ring makes it possible to vary the precipitating effect at will within certain limits. My invention provides that the trailing edges 7 of the precipitating members, or at least a portion of those edges, make an acute angle with the direction of flow. In this way, it is made sure that even those droplets which otherwise would be carried along by the gas stream will be collected at the points 8, thus preventing losses.

The separator shown in Figs. 1 and 2 may be arranged horizontally as well. If disposed horizontally, it is possible to divide the stream of the gaseous substance in the manner shown in Fig. 5. The lamellar partitions 2a are spaced wider apart in the lower portion of the vessel 1a in order to compensate for the reduction of the sections, caused by the precipitate collecting in the lower portions of the sections.

In Fig. 6, a horizontally arranged separator is shown which includes a vessel 1b defining a horizontal passageway for a stream of gaseous substance and is equipped with movable precipitating partitions 2b extending into the passageway and with fixed cleaning elements 15 which extend into the sections or spaces between the partitions and engage the latter to wipe the surfaces of the precipitating members. The partitions 2b rotate on the shaft 16 and may be actuated manually or automatically. The precipitated particles of the suspended phase are thereby wiped from the faces of the partitions 2b and made to flow along the edges 17 of the elements 15 toward a discharge or drain opening 10b. If the drain opening is brought almost to the level of the center of rotation, a closed vat will be formed, into which the partitions dip. With this modification, it is possible to fill the vat with a cooling or heating fluid which will maintain the precipitation surfaces at the optimum temperature, e.g., to heat the partitions when working with fluids of a high viscosity, and to cool the partitions when operating at high flow temperatures, and thus to exert a favorable influence on the conditions of precipitation. The same principle may be applied to an apparatus having several groups of rotating precipitating members arranged in tandem.

Fig. 7 shows a horizontal separator equipped with several groups of precipitating members of short length, arranged one behind the other. The trailing or discharging edges 7c remove part of the suspended particles. The separator of Fig. 7 is suitable, without any alteration, for vertical mounting or for use at any other angle.

If, as shown in Fig. 8, the separating members 2d are extended beyond the housing 1d and are made to be movable in the direction of the arrows 18, the parts which project beyond the housing may readily be cleaned of precipitated particles and/or coated with a wetting agent. The movement, cleaning, and wetting may be automatically controlled.

It will be appreciated that the use of a wetting agent will intensify the separating action. The separation, for instance, of dust offers great difficulties. Dust hardly adheres to dry precipitating surfaces and will again be carried away by the following stream of the gaseous substance. The use of a wetting agent, however, causes the dust particles to adhere to the surafce. The selection of the wetting agent depends to a great extent on the nature of the particles to be separated. For instance, oils are used to advantage for dust. In order to intensify the separating action still more, wetting agents may be used which act as solvents for the particles of the suspended phase. To impart dissolving properties to water as a wetting agent, I add, for instance, soaps or caustic soda. To mineral oils, I add methyl ethyl ketone, carbon tetrachloride, or other compounds. For the purpose of facilitating the wetting action and an even distribution on the precipitating surfaces, a wetting agent is used which will reduce the surface tension. As surface tension-reducing wetting agents, water with the addition of salts or esters of sulfonated fatty acids, or benzene may be used.

Besides the lamellar precipitating members so far shown, Figs. 9 to 14 illustrate various modifications of hollow precipitating members. These hollow bodies are used in the same way as the lamellar members. They are placed in a vessel conducting the gaseous substance so as to divide the passageway through the vessel into narrow sections again extending in the general direction of the flow of the gaseous substance. The hydraulic diameter of each section is approximately 0.2" at the most, and at least a portion of the trailing or discharging edges of each of the hollow bodies makes an acute angle with the direction of the stream of the gaseous substance.

Fig. 9 shows a precipitating member 2e of a rectangular gross section, which member has two trailing or precipitating edges 7e. The member 2f shown in Fig. 10 has at the end 20 opposite to the two trailing or precipitating edges 7f, apertures 21. The outer surfaces of member 2f may be wetted by means of an agent discharged from the interior 19 through the apertures 21. Such agent will increase, as has been pointed out, the adhering properties of the particles to be separated. In the member 2g shown in Fig. 11, the trailing edges 7g recede a distance 22 from the planes of the precipitating surfaces. Such recessions protect the particles precipitated from the gaseous stream and prevent them from being carried away. In the embodiments of precipitating members, shown in Figs. 12, 13, and 14, there is a groove 23, 24, and 25, respectively, between two pairs of trailing edges. An opening 26, 27, and 28, respectively, opens into the groove 23, 24, and 25, respectively. Precipitated particles which collect in the grooves may be washed away by rinsing fluid coming out from one of the openings 26, 27, and 28. As a rinsing fluid, water may be used that has soaps, lyes, or rinsing oils added thereto. It is sometimes advisable to use a rinsing fluid that has a dissolving action on the particles to be washed away. In Fig. 12, spraying means 29 are shown to spray wetting agents over the surfaces of the precipitating members. Such spray nozzles may be provided in connection with each type of the precipitating members shown in Figs. 9 to 11, 13 and 14, as well as with lamellar members.

In the separator shown in Figs. 15 and 16, three groups of hollow precipitating members 2k are used. The groups are arranged in tandem. Each group comprises a multitude of members arranged so as to form a crevice-like space between two adjacent members. The hydraulic diameter of such a space is approximately 0.2" at the most. From Fig. 15, it can be seen that the trailing edges 7k make an acute angle with the direction of the flow of the gaseous substance, and from Fig. 16 it will be seen that each member has two trailing edges 7k. There are a pipe 29a and branches 30 shown in Fig. 15, through which fluids may be conducted into the members. The fluid leaves through the branches 31 and the pipe 32. Adsorptive means 33, such as activated charcoal, are provided to retain undesirable gaseous components, odors, etc. Instead of having a common feed pipe, as shown in Figs. 15 and 16, a separate inlet-pipe may be provided for each of the groups of precipitating members. Such separate inlet-pipes are provided, for instance, to heat the different groups to different temperatures by passing therethrough differently heated fluids. In this manner, it is possible to increase or decrease the temperature of the successive groups stepwise in the direction of the flow of the gaseous substance. My invention makes a fractional separation possible.

The precipitating members may be of lamellar shape or formed as hollow bodies, for instance, like those shown in Figs. 9 to 14, and they have in either case at least two trailing edges, at least a portion of which makes an acute angle with the direction of flow.

From Fig. 17, the position of the precipitating members 2c (see Fig. 7) with respect to the gaseous flow will be clearly seen. The trailing edges 7c make an acute angle α with the direction of the gaseous flow, which will ensure a safe discharge of the precipitated substances, the direction of the gaseous flow being indicated by an arrow.

Figure 18:
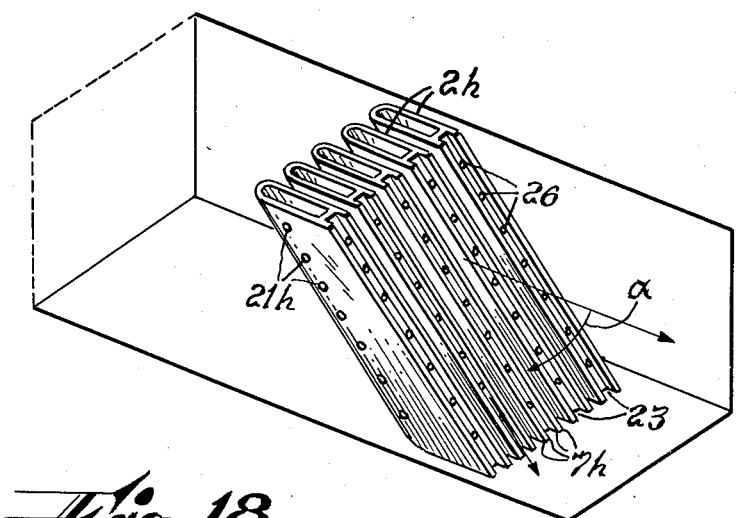
Fig. 18 is a perspective view of a group of precipitating members as shown in Fig. 12.

In Fig. 18, the hollow precipitating members 2h of Fig. 12 are shown, each member having four or two pairs of adjacent trailing edges 7h. In each precipitating member, there is a groove 23 between the two pairs of trailing edges, into which groove openings 26 open. Openings 21h are shown on the sides of the precipitating members.

If heating or cooling fluids are passed through precipitating members, such as shown in Figs. 9 to 14, the surfaces of the members, and hence the particles precipitated thereon, are, respectively, heated and cooled accordingly. The physical properties of the deposited particles, for instance, consistency and state of aggregation, can thus be beneficially effected. Viscid particles may be made to flow readily, and solid or semisolid particles may be liquefied. As temperature-controlling means, both gaseous and liquid fluids may be used.

The heating or cooling fluids cycled through hollow precipitating members may, in addition to having a heating or cooling action, also serve as a wetting and/or rinsing agent.

In accordance with a feature of my invention, I provide elements between adjacent precipitating members to wipe or clean the precipitating surfaces of the members. The wiping or cleaning elements are arranged not to interfere with the requirements for crevicelike sections of the passageway of the gaseous substance of a hydraulic diameter of approximately 0.2" or less. The wiping or cleaning elements may be of lamellar shape or formed as hollow bodies, for instance, like those shown in Figs. 9 to 14, and they may in either case have a trailing edge or trailing edges, at least a portion of which makes an acute angle with the direction of flow.

It is believed that the construction and operation of the forms of apparatus for practicing the invention, as shown, and the many advantages thereof will be understood from the foregoing detailed description.

Some of the features of the invention are reviewed hereinafter.

The passageway of the stream of the gaseous substance containing constituents to be separated is divided into many narrow spaces or sections. The stream itself is divided into just as many narrow streams. If the hydraulic diameter of the sections does not exceed one fifth of an inch substantially, the suspended particles are effectively precipitated on the walls of the precipitating members used, this being due to transverse components of the flow which become effective already after short distances. Although precipitation may be observed with hydraulic diameters of an order of magnitude of ⅓ to ¼" and even beyond this limit, an economical operation is only ensured at values of 0.2" or less.

As far as the precipitation of particles suspended in vapors and gases, according to my invention, is concerned, the shape of the walls defining the crevicelike sections is without consequence, as long as the hydraulic diameters have the values given hereinbefore. It is neither necessary that the precipitating walls are plane, nor that they are parallel. Nor do two walls, in the case of curved shapes, have to be equidistant. The full precipitating effect may, thus, be achieved with precipitating walls which are neither parallel nor equidistant. The same holds for separators in which the precipitating partitions are rolled into a spiral, and the individual turns may have equal or varying pitch, again as long as the hydraulic diameters are within the referred to limits. In Fig. 5, precipitating members have been shown which are arranged so that the sections widen towards the bottom of the horizontal vessel. It is in some cases useful to provide the members so that the sections between them widen in the direction of the flow.

It will be apparent that while I have shown and described my invention in a number of forms, many changes and modifications may be made without departing from the spirit of the invention defined in the following claims.

I claim:
1. Apparatus for separating liquid and solid particles from a gaseous substance, comprising a vessel having substantially aligned inlet and outlet ports on opposite sides thereof and defining an essentially straight passageway for the gaseous substance containing the particles to be separated therefrom, and substantially platelike precipitating members within said vessel, the precipitating members being arranged to divide at least a portion of said passageway into narrow sections, each section extending along a straight line of connection between said ports, each precipitating member having at least two trailing edges, the hydraulic diameter of each of said sections being 0.2" at the most, so that particles are deposited from the gaseous substance flowing through each section onto the confronting faces of the members at opposite sides of the section, at least a portion of each of the trailing edges being disposed at an acute angle with respect to said straight passageway, the angle being sufficiently small to ensure the adherence to the trailing edges of particles deposited on said confronting faces.

2. Apparatus according to claim 1, wherein at least a part of the members are formed as hollow bodies.

3. Apparatus according to claim 2, wherein the hollow members have apertures, the apparatus further including means to conduct fluids through the hollow members.

4. Apparatus according to claim 3, wherein the members each have two trailing edges and a groove between said two edges.

5. Apparatus according to claim 2, wherein the members each have two trailing edges.

6. Apparatus according to claim 5, wherein the trailing edges recede from the planes of the precipitating surfaces.

7. Apparatus according to claim 1, wherein an insert is removably secured within the vessel, and holds the members in the desired positions.

8. Apparatus according to claim 1, wherein the vessel is horizontally arranged, the members being disposed relative to each other so that their planes intersect outside of and above the vessel.

9. Apparatus according to claim 1, wherein the members are movably mounted with respect to said vessel.

10. Apparatus according to claim 1, wherein the members are arranged in more than one group, the groups succeeding one another, when viewed in the general direction of the flow of the gaseous substance, whereby the trailing edges of each precipitating member of a group are separated from the leading edge of a precipitating member of the next succeeding group.

11. Apparatus according to claim 1, further comprising spraying means disposed ahead of the precipitating members to permit spraying wetting fluid into the stream of the gaseous substance.

12. The apparatus according to claim 1, further comprising absorbing means disposed downstream with respect to said members for the stream of the gaseous substance to pass therethrough after the separation of the matter to be removed from the gaseous substance.

References Cited in the file of this patent

UNITED STATES PATENTS

| | | |
|---|---|---|
| 734,818 | Cazin | July 28, 1903 |
| 1,190,037 | Stock | July 4, 1916 |
| 1,519,428 | Wilisch | Dec. 16, 1924 |
| 1,989,773 | Snow | Feb. 5, 1935 |
| 2,126,481 | Lapp et al. | Aug. 9, 1938 |
| 2,133,819 | Howse et al. | Oct. 18, 1938 |
| 2,838,132 | Markham et al. | June 10, 1958 |

FOREIGN PATENTS

| | | |
|---|---|---|
| 4,590 | Great Britain | Oct. 20, 1881 |
| 33,416 | France | Apr. 23, 1928 |
| | (Addition to No. 620,108) | |